(12) United States Patent
Dickerson et al.

(10) Patent No.: US 7,016,745 B1
(45) Date of Patent: Mar. 21, 2006

(54) NC PROGRAMMING AND PREDETERMINED PRACTICES INTEGRATION

(75) Inventors: Wade E. Dickerson, Seattle, WA (US); Amitabh Vyas, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 11/018,492

(22) Filed: Dec. 21, 2004

(51) Int. Cl.
*G06F 19/00* (2006.01)
*G05B 19/00* (2006.01)
(52) U.S. Cl. .......................... 700/86; 700/97; 700/182
(58) Field of Classification Search .................. 700/17, 700/18, 86, 87, 97, 180–185; 715/964–967; 717/106–110; 318/567, 568.1, 569; 483/15
See application file for complete search history.

(56) References Cited

U.S. PATENT DOCUMENTS

| | | | | |
|---|---|---|---|---|
| 5,973,466 A | * | 10/1999 | Nogami et al. | 318/569 |
| 6,522,346 B1 | * | 2/2003 | Meyer | 715/771 |
| 6,701,513 B1 | * | 3/2004 | Bailey | 717/109 |
| 6,721,614 B1 | * | 4/2004 | Duncan et al. | 700/97 |
| 6,775,585 B1 | * | 8/2004 | Bedont et al. | 700/182 |
| 6,868,297 B1 | * | 3/2005 | Rimoldi et al. | 700/98 |
| 2004/0068342 A1 | * | 4/2004 | Bedont et al. | 700/182 |

* cited by examiner

*Primary Examiner*—Maria N. Von Buhr
(74) *Attorney, Agent, or Firm*—Perkins Coie LLP (57) ABSTRACT

A computer-based facility configured for programming of numerically controlled (NC) machines includes an NC data set generator component used in allowing a user to select data sets for NC programs that control the NC machines. For example, such data sets may include features, processes, tools, and functions combined in accordance with predetermined practices, such as best practices. Aspects of the facility allow for integration of generated data sets into a computer aided drafting/computer aided manufacturing (CAD/CAM) environment, such as CATIA.

25 Claims, 10 Drawing Sheets

NC PROGRAMMING AND PREDETERMINED PRACTICES INTEGRATION

TECHNICAL FIELD

The present invention relates generally to methods and systems for applying and configuring data, for example, methods and systems for applying and configuring data used in programming for numerically controlled (NC) machines.

BACKGROUND

The use of numerical controlled (NC) machines (e.g., drilling machines, boring machines, milling machines, etc.) in manufacturing provides many advantages. For example, the use of NC machines helps ensure consistent results when machining parts (e.g., airplane parts) and minimizes human error (allowing for a tight tolerance range). Moreover, NC machines significantly reduce the cost of generating parts that have complex geometry.

While NC machines provide many advantages and reduce the amount of human labor needed for machining parts, it is still necessary for a human NC programmer to write the code (i.e., computer-readable instructions) that controls the NC machine so that it can perform processes with respect to a part. Some computer aided drafting/computer aided manufacturing (CAD/CAM) software packages, such as CATIA V5, provide NC programming functionality and tools to simplify the NC programming processes. However, despite the availability of software packages that make NC programming easier, NC programmers may still be plagued with complexity, uncertainty, and inconsistency when faced with the task of writing NC program code. For example, because many NC machines have interchangeable tools and can perform multiple processes, there are often many options available for manufacturing the same part or part feature, a problem which current NC programming packages do not currently address.

In an attempt to provide uniform standards for NC programmers and address some of the problems described above, many parts manufacturers have established predetermined practices for parts manufacturing. A particular industry's or manufacturer's preferred techniques, sometimes called "best practices" provide an example of such predetermined practices. For example, a best practice for creating any given part may specify the machine, the tool, and processes to be used (e.g., the drill bit to use, the angle at which to drill a hole, the speed at which a drill bit should move, etc.). In general, incorporating predetermined practices into NC programming allows for efficient use of available resources and consistency in output. However, current techniques for incorporating predetermined practices into NC programming are cumbersome and limited. For example, best practices are typically implemented as a set of external written instructions and guidelines that the NC programmer must either memorize or manually reference while using software packages such as CATIA to write NC programs. Then, during programming, the NC programmer may consult data tables that supply optimum parameters for a given machining scenario and then may manually enter the appropriate data.

SUMMARY

The present invention is directed toward a computer-implemented facility for programming numerically controlled (NC) machines used in parts manufacturing. In many cases, it is desirable to conduct programming of NC machines in accordance with predetermined practices. Accordingly, in one embodiment, the facility interacts with a programmer to generate data sets for NC programs in accordance with predetermined practices. This interaction may include obtaining a set of information associated with manufacturing a part (e.g., an airplane part). For example, the set of information may include information identifying a feature (e.g., a hole, a wall, a wall top, a wall top fillet, a corner, a floor, a floor fillet, etc.) to be established with respect to the part; information identifying a process (e.g., facing, rough milling, finish milling, form milling, kellering, drilling, etc.) to be used in establishing the feature with respect to the part; and information identifying a tool (e.g., face mill, end mill, drill, etc.) to be used for performing the identified process.

In some embodiments, the facility collects information for generating the data set by presenting a series of screens or forms allowing the programmer to select from available feature options, process options, and tool options. Because not all combinations of features, processes, and tools are in accordance with desired predetermined practices, the facility may limit the options presented based on one or more previous programmer selections. For example, after receiving a feature selection from the programmer, the facility may identify and present a limited collection of process options each known to produce the selected feature in accordance with at least one predetermined practice rule.

In some embodiments, the facility integrates the generated data set with information in a computer aided drafting/computer aided manufacturing (CAD/CAM) environment that is configured for NC programming. For example, the facility may identify an incomplete machining operation definition from a set of incomplete machining operation definitions. In some embodiments, the facility identifies this incomplete machining operation definition based on its compatibility with the generated data set. The facility may then proceed with automatically populating variables (e.g., part geometry variables, strategy variables, and cutting parameter variables) of the incomplete machining operation definition, based, at least in part, on the information from the generated data set. The facility may also obtain input from the programmer for further populating the variables of the incomplete machining operation definition. In this way, the facility produces a completed machining operation that may be used to control an NC machine.

DETAILED DESCRIPTION

The following disclosure describes systems, methods, and formats for facilitating programming of numerically controlled (NC) machines in accordance with predetermined practices, such as "best practices." For example, a data set generation component may facilitate efficiently gathering data that is in accordance with predetermined practices from an NC programmer. The term "data" is used herein in the collective sense to mean a set of one or more datum. In another example, an integration component provides functionality to help integrate data gathered using the data set generation component into a CAD/CAM environment that can further facilitate NC programming.

Certain specific details are set forth in the following description and in FIGS. 1–6 to provide a thorough understanding of various embodiments of the invention. Well-known structures, systems and methods often associated with NC programming systems and, more generally, CAD/CAM environments have not been shown or described in detail to avoid unnecessarily obscuring the description of the various embodiments of the invention. Those of ordinary skill in the relevant art will understand that additional embodiments of the present invention may be practiced without several of the details described below.

Many embodiments of the invention described below may take the form of computer-executable instructions, including routines executed by a programmable computer (e.g., a computer-controlled design process). Those skilled in the relevant art will appreciate that the invention can be practiced with other computer system configurations as well. The invention can be embodied in a special-purpose computer or data processor that is specifically programmed, configured, or constructed to perform one or more of the computer-executable instructions described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, as well as distributed electronically over networks. Data structures and transmissions of data particular to aspects of the invention are also encompassed within the scope of the invention.

I. Representative Environment

Figure 1:
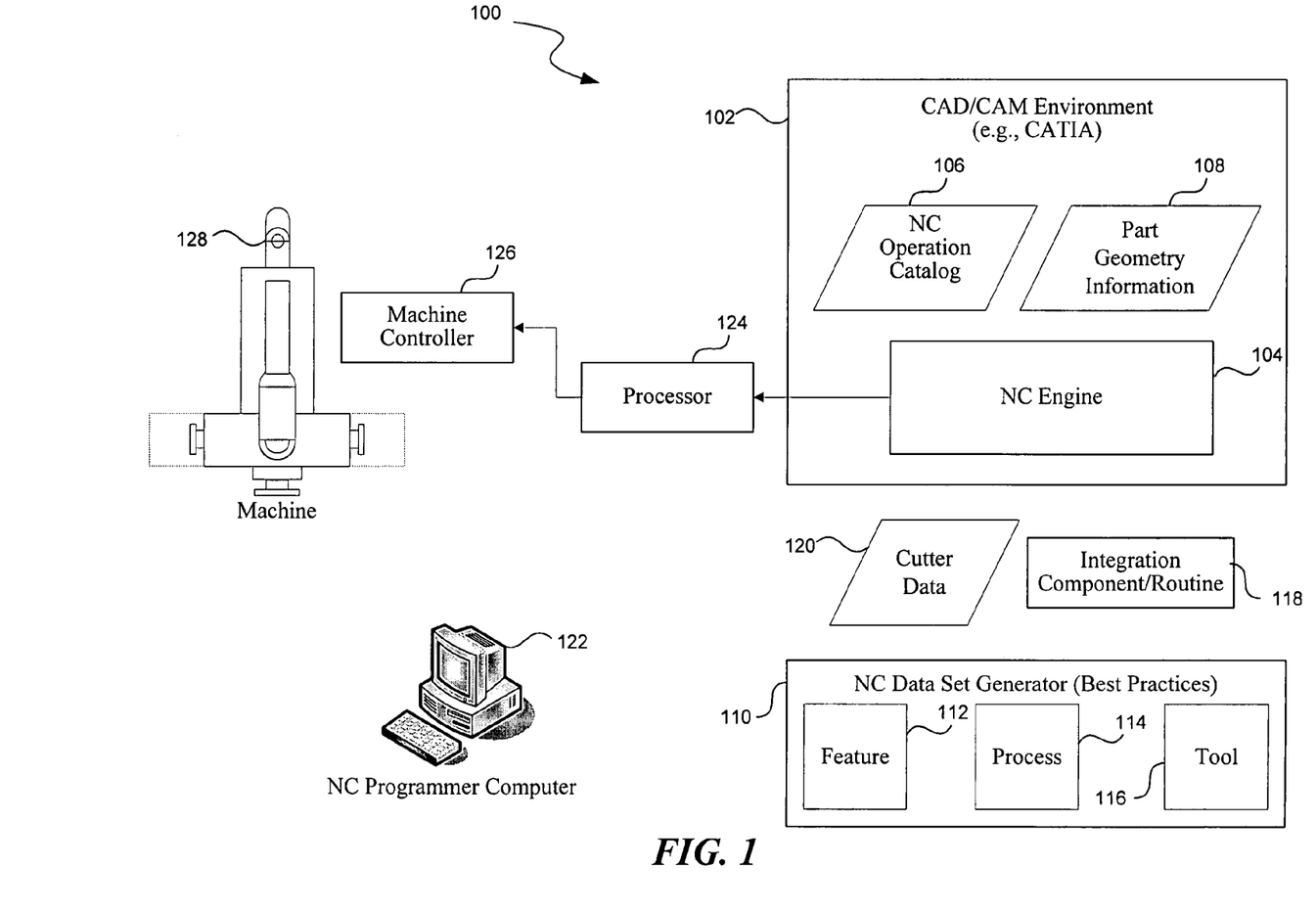
FIG. 1 is a block diagram illustrating a representative NC programming environment for practicing an embodiment of the invention.

FIG. 1 is a block diagram illustrating a representative environment 100 for practicing an embodiment of the invention. The environment 100 may be implemented using one or more computers, such as a single computer, or computers on a network (e.g., a local area network (LAN) or other network) consisting of one or more processors, memory, hard drives, input/output features, operating systems, graphics features, etc., (not illustrated to maintain clarity in the Figures, and because they are well known in the art).

The representative environment 100 may include a computer aided drafting/computer aided manufacturing (CAD/CAM) environment 102 such as CATIA, or any other CAD/CAM software package. The CAD/CAM environment 102 may include an NC engine 104 that facilitates NC programming by providing capabilities such as documentation features that store descriptions of machining sequences and lists of cutting tools used. The NC engine 104 may also allow users to (e.g., human programmers) import, review, and manipulate information files used in NC programs (e.g., APT, CL, and ISO code files).

The CAD/CAM environment 102 may further include an NC operations catalog 106 that may contain a set of predefined machining operations. Each predefined machining operation may function as a generic framework for completed, part-specific machining operations. For example, some of the attributes of a predefined machining operation (e.g., cutter RPM, feed rate, etc.) may be complete while others (e.g., part-specific geometry information) are populated or filled-in later, after more specific part and process data is provided (e.g., by a human programmer or from another data source). In some embodiments, the CAD/CAM environment 102 locally stores part geometry data 108 in the form of files, etc.

The representative environment 100 may also include an NC data set generator component 110 that facilitates incorporating predetermined practices into machine operations implemented, at least in part, using the CAD/CAM environment 102. The NC data set generator component 110 may store and provide a user interface to access a series of option sets that allow the programmer to easily comply with predetermined practices in creating a machining operation data set (e.g., a best practices data set). For example, the programmer first selects from available feature options 112, which leads to the selection of a process from available process options 114, which then leads to the selection of a tool from available tool options 116. The NC data set generator component 110 and its available data option sets (112, 114, and 116) are described in more detail with respect to FIGS. 2 and 3, respectively.

The representative environment 100 may also include an integration component 118 that accepts data sets (e.g., best practices data sets) generated using the NC data set generator component 110 and routes data from the data sets into corresponding variable locations of predefined machining operations associated with the CAD/CAM environment 102 to create a complete machining operation. An example of a process of creating a complete machining operation is described in more detail with respect to FIGS. 4A–4C and FIG. 6.

The representative environment may further include cutter data 120 for any available machines 128. In the illustrated embodiment, the cutter data 120, to which the integration component 118 may have direct access, is external to both the NC data set generator component 110 and the CAD/CAM environment 102. However, alternative locations for the cutter data 120 are possible (e.g., in the NC data set generator component or the CAD/CAM environment 102). In some embodiments, the cutter data 120 includes Excel spreadsheets containing data that is associated with the available machines 128. In some embodiments, completed machining operations may be transferred to a processor 124 for final processing before being used as instructions at a machine controller 126, which controls functions of the machine 128.

Figure 2:
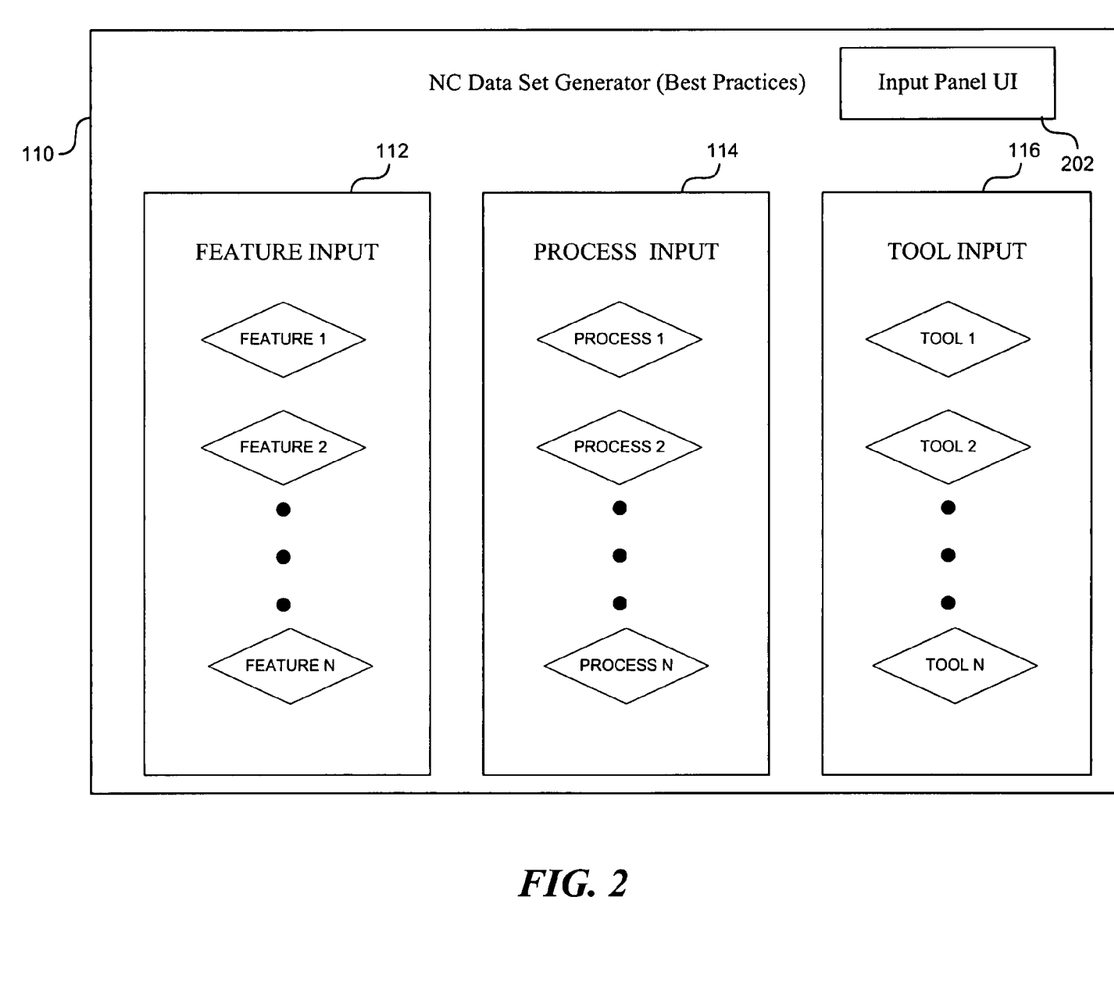
FIG. 2 is a block diagram illustrating a more detailed view of the NC data set generator of the NC programming environment of FIG. 1.

FIG. 2 is a block diagram illustrating a more detailed view of the NC data set generator component 110. The NC data set generator component 110 may systematically display appropriate data from each of the three data options sets (112, 114, and 116) via an input panel user interface (UI) 202. For example, the feature options set 112 may include options corresponding to topographical characteristics that can be machined into a part (e.g., a hole, a wall, a wall top, a wall top fillet, a corner, a floor, a floor fillet, etc.). The process options set 114 includes a complete set of movements (e.g., facing, rough milling, finish milling, kellering, form milling, drilling A, drilling B, etc.) that a tool can perform in association with a part. Similarly, the tools options set 116 includes a complete set of available tools (e.g. a face mill, an end mill, drill bit A, drill bit B, etc.).

In accordance with a collection of established predetermined practices, each process with the process data options set 114 may correspond to one or more of the available geometric features. For example, in some embodiments, the data structures used to represent the process data options in the process data options set 114 may include pointers or other references to corresponding features of the feature data options set 112. Likewise, in accordance with predetermined practices, each tool within the tools data options set 116 may correspond to one or more processes (or one or more feature/process combinations). With this (and similar) configurations, it is possible to interactively guide the programmer through a process of efficiently selecting available features, processes, and tools, while staying within the confines of predetermined practices, as is discussed in more detail with respect to FIGS. 3A–3C.

While three specific option sets are described herein for illustrative purposes, one skilled in the art would recognize that different numbers, types, or combinations of data sets are possible. Furthermore, in some embodiments, the initial screen of the input panel UI may allow a user to bypass the feature/process/tool selection process by allowing the programmer to directly select a function option that comprises the interactive subroutines of a computer aided manufacturing (CAM) program. The subroutines may be used to create the movements that a tool makes in the execution of a processes that creates a feature on a machined part.

III. Representative Flows

Figure 3A:
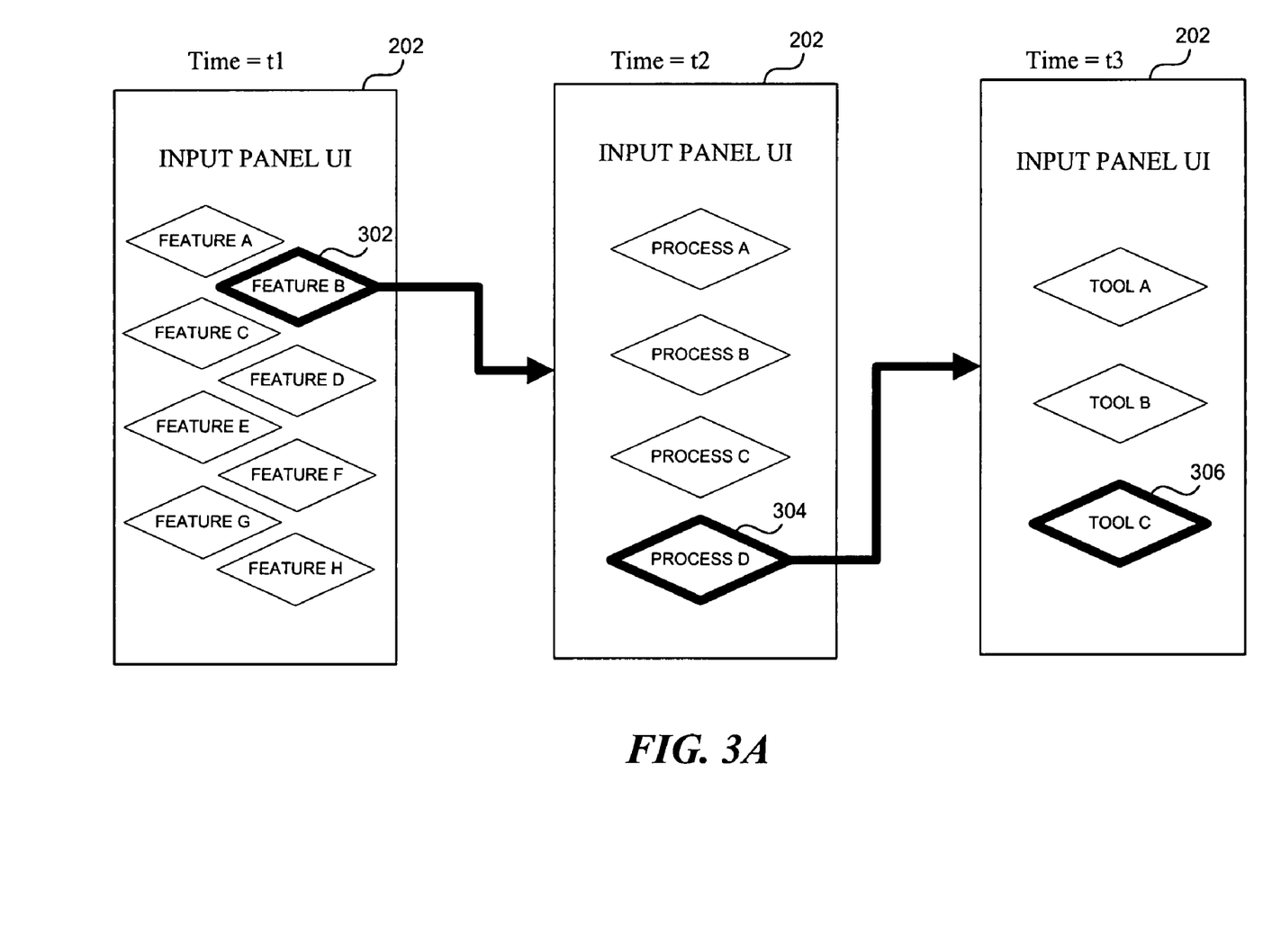
FIGS. 3A–3C are a data flow diagrams illustrating data used in providing a user with input choices for NC programming that are consistent with predetermined practices in an embodiment of the invention.

FIG. 3A is a data flow/display diagram illustrating generating a data set (e.g., a best practices data set), including providing the programmer with input choices consistent with predetermined practices for an NC program in an embodiment of the invention. FIG. 3A shows the input panel UI 202 of the NC data set generator component 110 during three successive time frames, t1, t2, and t3. At time frame t1, the input panel UI 202 displays a set of all currently available features that are consistent with predetermined practices. Upon receiving a selection of a desired feature 302 (e.g., a hole) from the programmer, at time frame t2, the input panel UI 202 displays a set of one or more processes (e.g., drill and helical interpolation) that have each been identified as a "preferred" way to create the selected feature 302. Upon receiving a selection of a desired process 304 (e.g., drill) from the programmer, at time frame t3, the input panel UI 202 displays a set of one or more tools (e.g., drill bit 1, drill bit 2, etc.) that have each been identified as "preferred" tools for executing the selected process or process/feature combination. After the programmer selects a desired tool 306 from the input panel UI 202 (for example, as displayed at t3) further selection options may be provided, such as those illustrated with respect to FIGS. 3B and 3C.

Figure 3B:
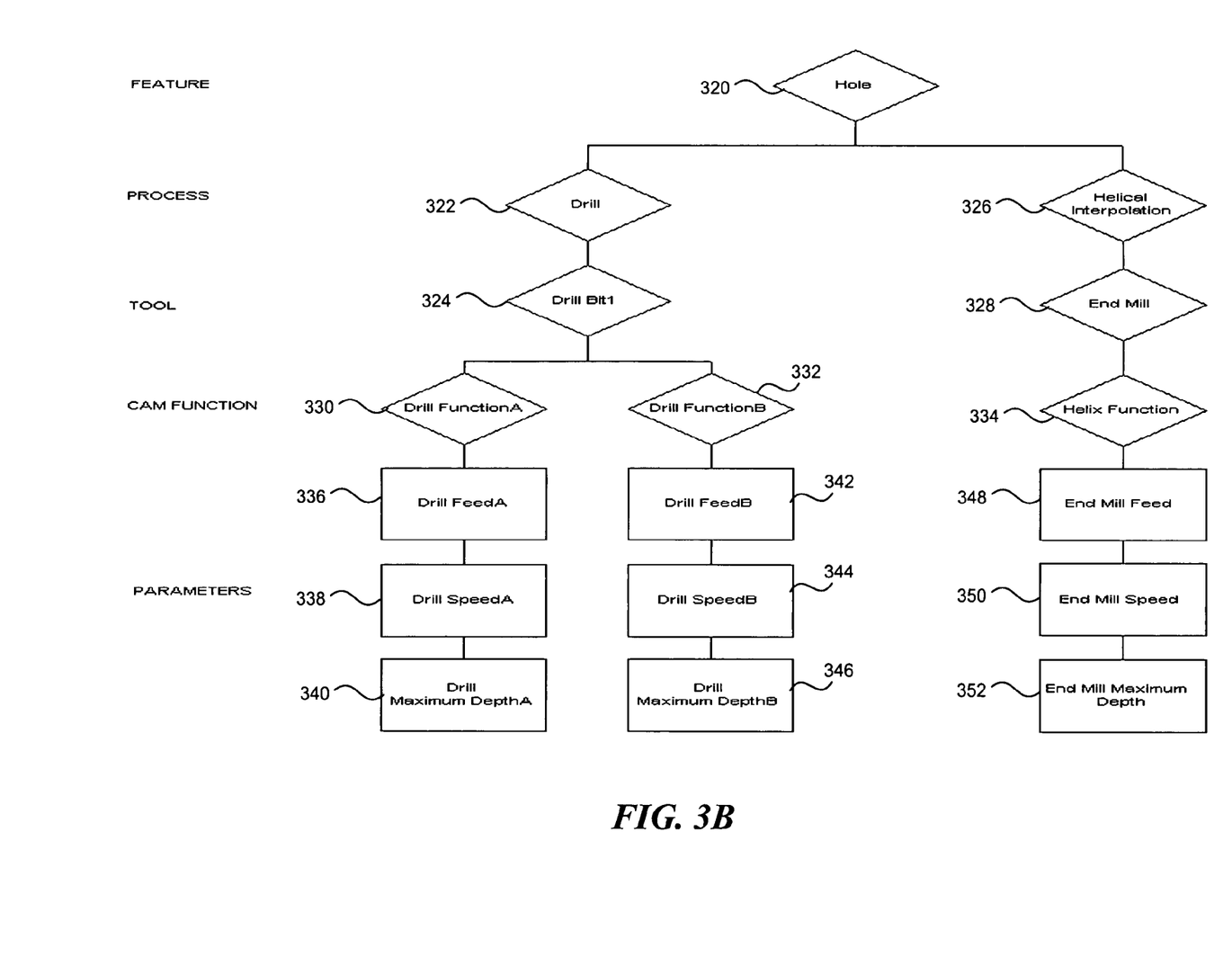

FIG. 3B is a data flow diagram illustrating an example of generating a data set (e.g., a best practices data set) associated with a selected "Hole" feature 320, including providing the programmer with input options associated with selecting a tool-driven computer aided manufacturing (CAM) function and associated parameters (in addition to input options related to features, processes, and tools). In some embodiments, the CAM function drives the tool that performs the process to create the desired feature.

The user may select the CAM function after selecting a feature/process/tool combination. And like the process for selecting a feature/process/tool combination, the process for selecting the CAM function may also be driven by predetermined practices. For example, if the programmer selects a "Drill" process 322 and a "Drill Bit" tool 324 to create the desired "Hole" feature 320, the programmer may then select from two available CAM functions: "Drill Function A" 330 and "Drill Function B" 332. Alternatively, if the programmer selects a "Helical Interpolation" process 326 and an "End Mill" tool 328 to create the desired "Hole" feature 320, the programmer may then select from a "Helix Function" CAM function 334 and possibly other CAM functions (not shown).

Each CAM function may be associated with a set of parameters. For Example, the "Drill Function A" CAM function 330 may be associated with a "Drill Feed A" parameter 336, a "Drill Speed A" parameter 338, and a "Drill Maximum Depth A" parameter 340. Similarly, the "Drill Function B" CAM function 332 may be associated with a "Drill Feed B" parameter 342, a "Drill Speed B" parameter 344, and a "Drill Maximum Depth B" parameter 346. In a similar fashion, the "Helix Function" CAM function 334 may be associated with an "End Mill Feed" parameter 348, an "End Mill Speed" parameter 350, and a "Drill Maximum Depth" parameter 352. In some embodiments, the programmer may interact with the input panel UI 202 of the NC data set generator component 110 to define values associated with such parameters. It may also be possible for the NC data set generator component 110 to define some parameter values automatically.

Figure 3C:
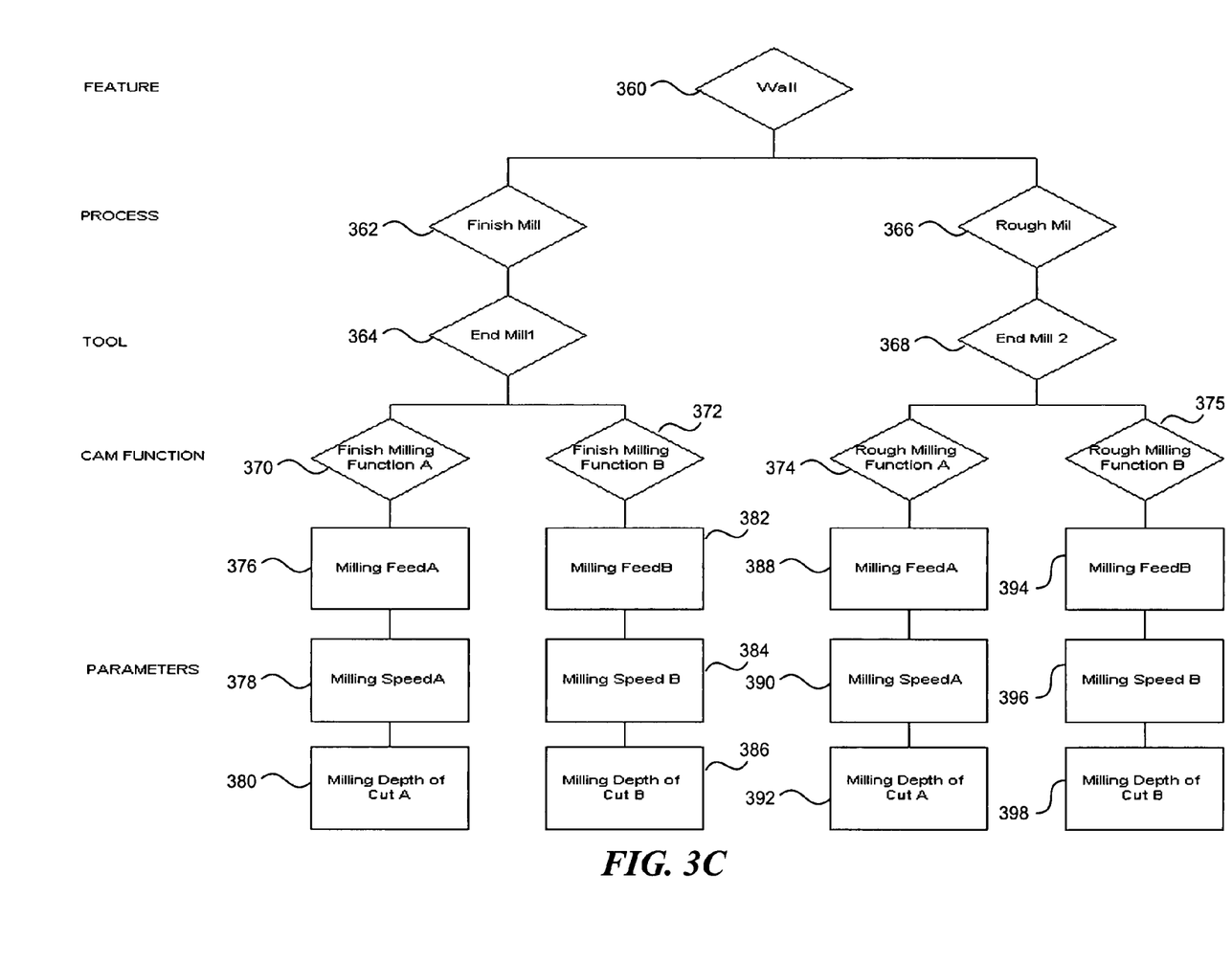

FIG. 3C shows a similar example of generating a data set (e.g., a best practices data set) associated with a selected "Wall" feature 360. In this example, if the programmer selects a "Finish Mill" process 362 and an "End Mill 1" tool 364 to create the desired "Wall" feature 360, the programmer may then select from two available CAM functions: "Finish Milling Function A" 370 and "Finish Milling Function B" 372. Alternatively, if the programmer selects a "Rough Mill" process 366 and an "End Mill 2" tool 368 to create the desired "Wall" feature 360, the programmer may then select from a "Rough Milling Function A" CAM function 374, a "Rough Milling Function B" CAM function 375 and possibly other CAM functions (not shown).

Each CAM function may be associated with a set of parameters. For Example, the "Finish Milling Function A" CAM function 370 may be associated with a "Milling Feed A" parameter 376, a "Milling Speed A" parameter 378, and a "Milling Depth of Cut A" parameter 380. Similarly the "Finish Milling Function B" CAM function 372 may be associated with a "Milling Feed B" parameter 382, a "Milling Speed B" parameter 384, and a "Milling Depth of Cut A" parameter 386. The "Rough Milling Function A" CAM function 374 may have parameters such as "Milling Feed A" 388, "Milling Speed A" 390, and "Milling Depth of Cut A"

392. In a similar configuration, the "Rough Milling Function B" CAM function 375 may have parameters such as "Milling Feed B" 394, "Milling Speed B" 396, and "Milling Depth of Cut B" 398. As with the parameters of FIG. 3B, in some embodiments, the programmer may interact with the input panel UI 202 of the NC data set generator component 110 to define values associated with such parameters. It is also possible for the NC data set generator component 110 to define some parameter values automatically. While specific examples have been shown and described, countless other variations and combinations of parameters, CAM functions, tools, processes, and features are possible.

Figure 4A:
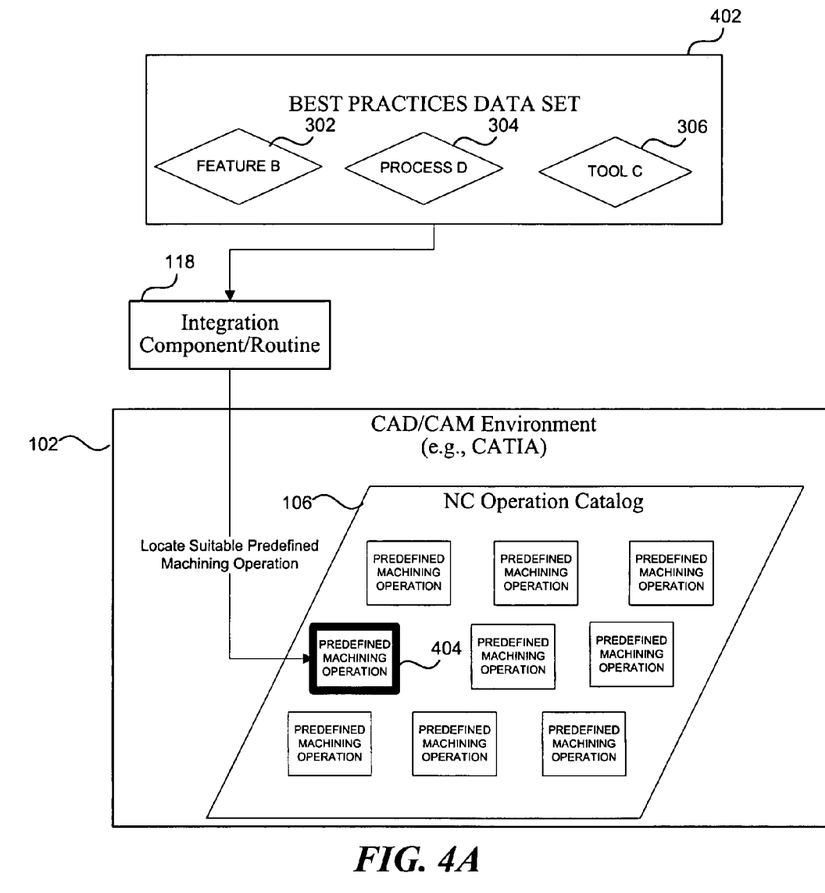
FIGS. 4A–4C are flow diagrams illustrating interaction of components of the NC programming environment of FIG. 1 during the generation of a machine operation instruction for an NC program in an embodiment of the invention.
Figure 4B:
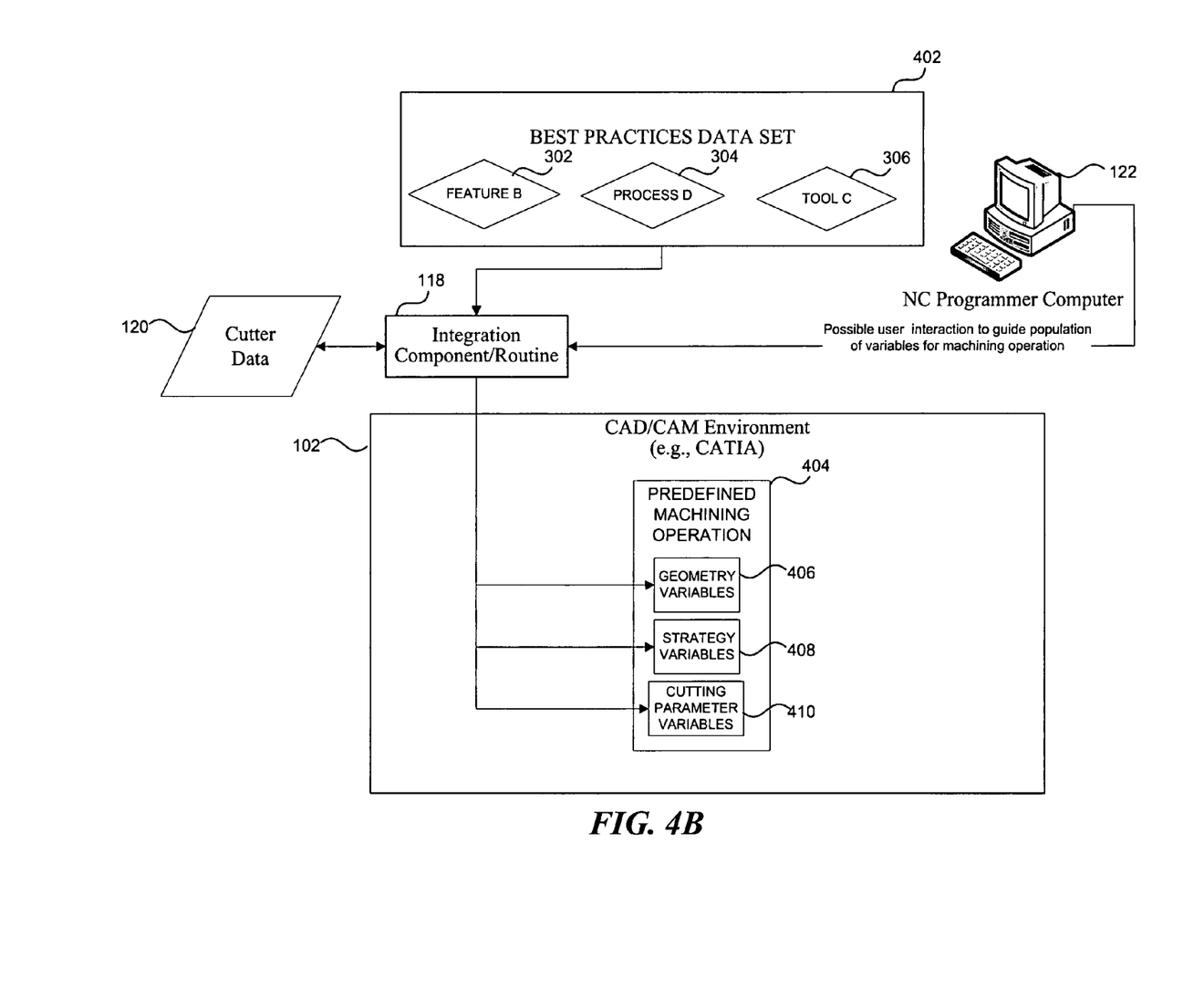
Figure 4C:
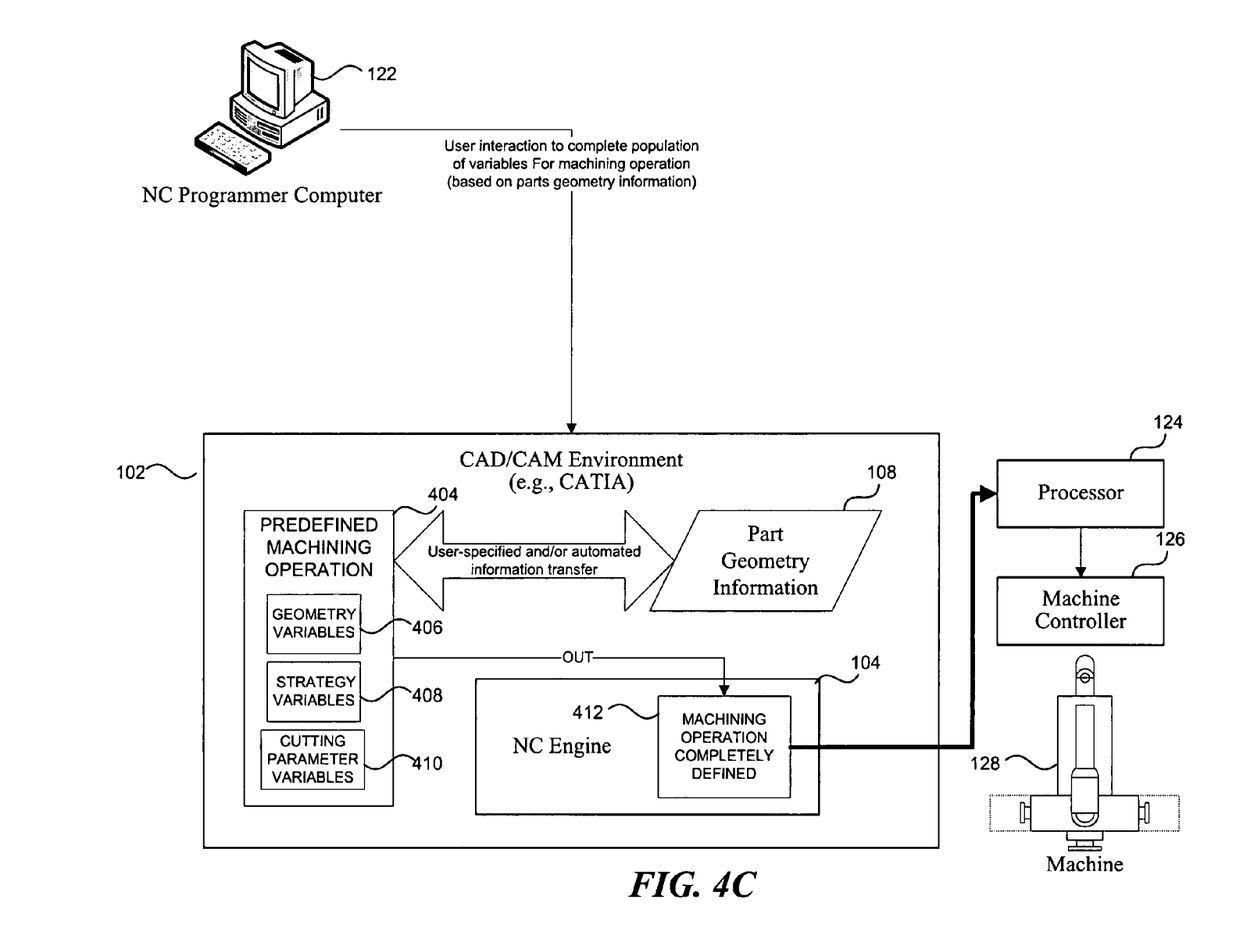

FIGS. 4A–4C are flow diagrams illustrating interaction of components of the environment of FIG. 1 during the generation of a machine operation instruction for an NC program in an embodiment of the invention. Referring to FIG. 4A, after the programmer interacted with the environment to generate a data set, such as a best practices data set 402 including feature B 302, process D 304 and tool C 306, the integration component routine 118 interacts with the CAD/CAM environment to automatically identify a suitable predefined machining operation 404 from the NC operation catalog 106. Based on the best practices data set 402, the integrator component routine 118 now possesses information relating to the type of feature to be machined, the process to create it, and the cutting tool used to execute the process. Accordingly, the matter of automatically identifying a suitable predefined machining operation 404 may be based, at least in part, on this information.

Referring to FIG. 4B, after the integrator component routine 118 identifies a suitable predefined machining operation 404, the suitable predefined machining operation 404 is isolated for further interaction with the integrator component routine 118. Interaction with the integrator routine 118 may involve the NC programmer interacting with the system via the NC programmer computer 122. In addition, the integration component/routine 118 may interact with available cutter data to further define variables for the isolated predefined machining operation 404. Such variables may include geometry variables 406, strategy variables 408 (which designate machining strategies such as climb milling or cut milling), and cutting parameter variables 410.

In general, the geometry variables 406 and the strategy variables 408 may be based on a combination of information from the best practices data set 402 and information provided by the programmer at the NC programmer computer 122. As shown in FIG. 4C, the part geometry data 108 within the CAD/CAM environment 102 may also play a role in the process of populating the geometry variables. For example, information stored in the part geometry data 108 may allow the programmer to easily configure numerical coordinates and parameters for a particular part, without having to refer to manuals, other otherwise start from scratch. The cutting parameter variables 410 may be based on a combination of information from the best practices data set, 402, the cutter data 120, and information provided by the NC programmer at the NC programmer computer 122.

At some point during the process of populating variables, a completed machining operation 412 may be loaded or otherwise inserted into the NC Engine 104 that is part of the CAD/CAM environment 102. From there, the processor component 124 may access the completed machining operation 412. The processor component 124 may conduct final processing before passing the completed machine operation 412 to the machine controller 126 for execution.

Figure 5:
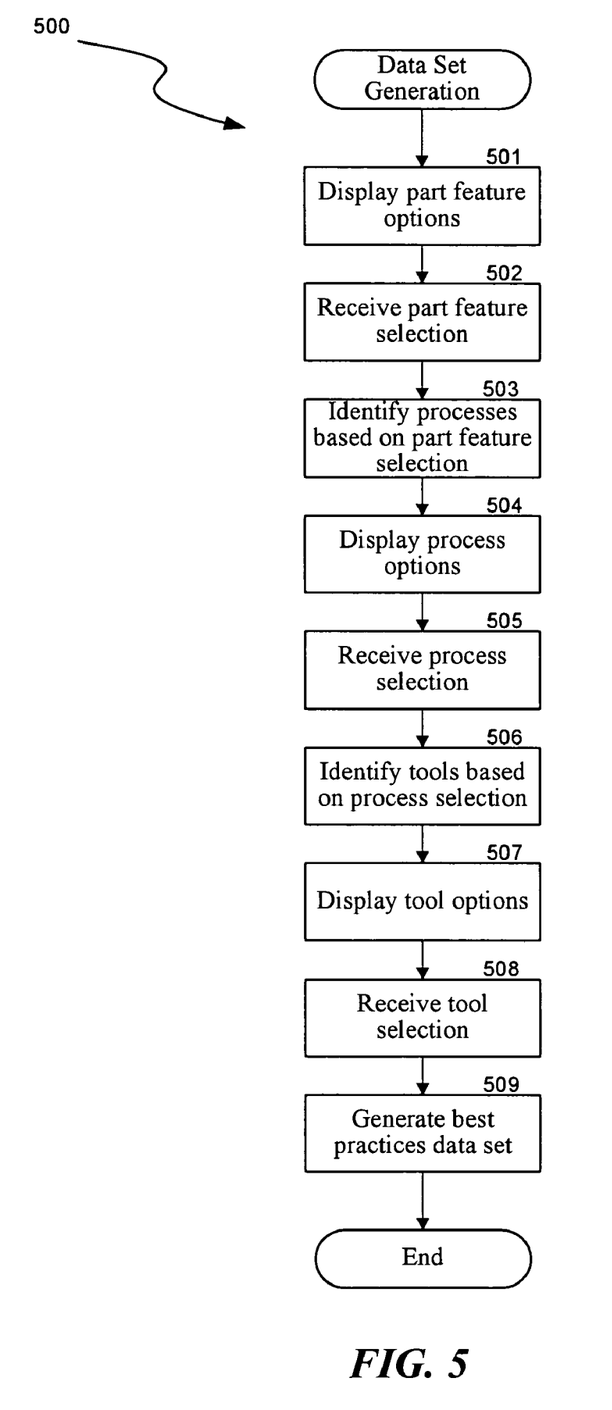
FIG. 5 is a flow diagram illustrating a data set generation routine that allows a user to select a set of inputs consistent with predetermined practices for an NC program in an embodiment of the invention.

FIG. 5 is a flow diagram illustrating an NC data set generator routine 500 that allows a programmer to select a set of NC programming inputs consistent with best practices for an NC program in an embodiment of the invention.

At block 501 the routine 500 displays feature options to the programmer, for example, via an input panel UI. At block 502 the routine 500 receives a feature selection from the programmer. At block 503, based on the received feature selection and based on program rules concerning predetermined practices, the routine 500 identifies one or more process options to display to the programmer. At block 504 the routine 500 displays the one or more process options, for example, via the input panel UI. At block 505 the routine 500 receives a process selection from the programmer. At block 506 the routine 500, based on the received process selection and based on the program rules concerning predetermined practices, identifies one or more tool options to display to the programmer. At block 507 the routine 500 displays the identified tool options, for example, via the UI input panel. At block 508 the routine 500 receives a tool selection from the NC programmer. At block 509 the routine 500 generates a data set (e.g., a best practices data set) based on the selections of blocks 502, 505, and 508. The routine 500 may end after block 509.

Figure 6:
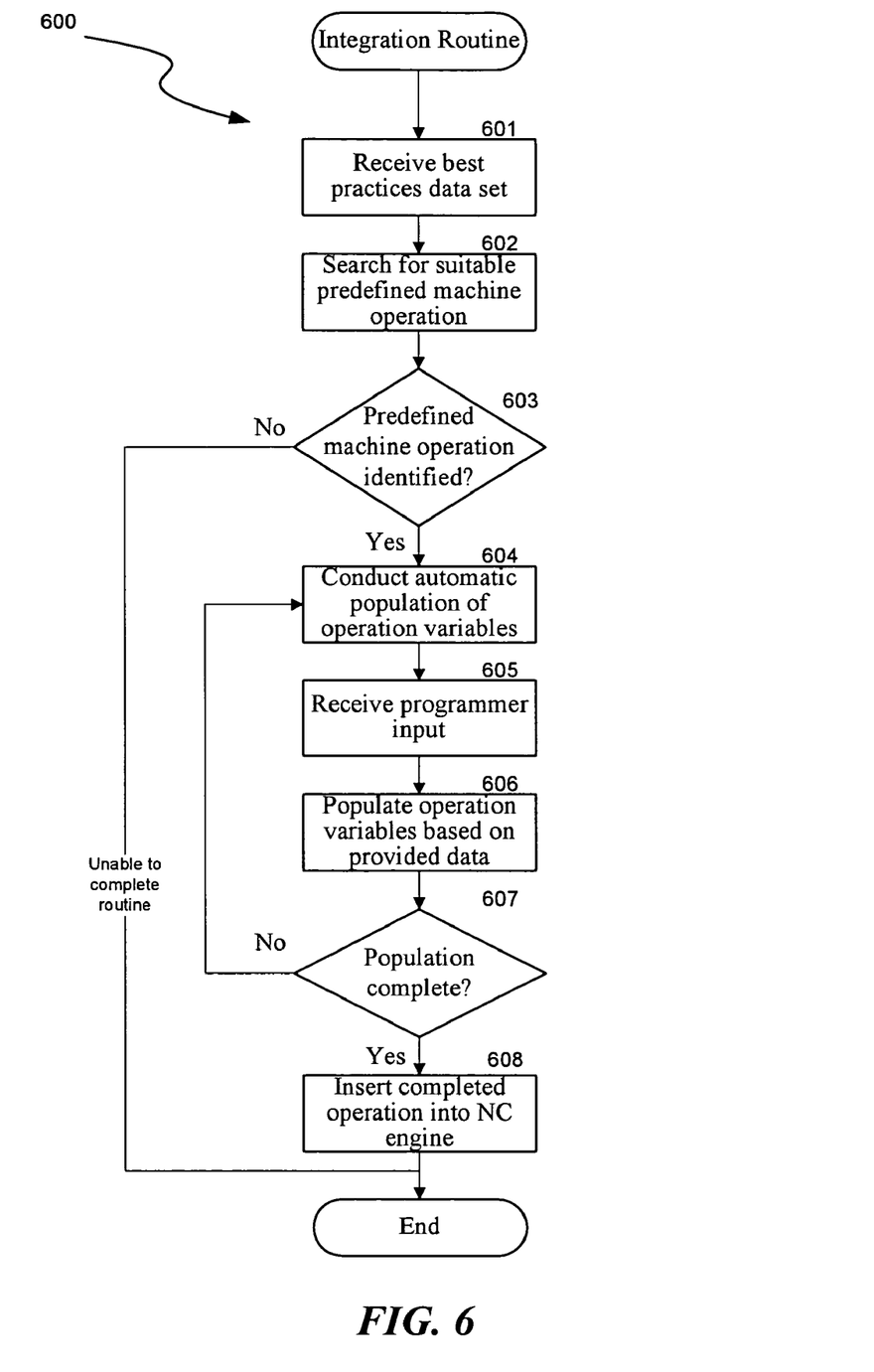
FIG. 6 is a flow diagram illustrating an integration routine for generating machine operation instructions for an NC machine in an embodiment of the invention.

FIG. 6 is a flow diagram illustrating integration routine 600 for generating a completed machine operation instruction for an NC program in an embodiment of the invention. At block 601 the routine 600 receives information from a data set, such as the best practices data set 404 of FIGS. 4B and 4C. At block 602 the routine 600 searches for a suitable predefined machining operation based on the information from the best practices data set. At decision block 603, if the routine 600 does not identify a suitable predefined machining operation, the routine 600 ends. However, if at decision block 603, the routine 600 identifies a suitable predefined machining operation, the routine 600 continues at block 604 where the routine 600 performs automatic and semiautomatic population of variables of the predefined machining operation. At block 605 the routine 600 receives input from an NC programmer. At block 606 the routine 600 further performs automatic and/or semiautomatic population of the variables of the predefined machining operation.

At decision block 607 the routine 600 determines whether population of the predefined machining operations is complete. If at decision block 607 the population of the predefined machining operation variables is not complete, then the routine 600 loops back to block 604 to perform further population. If however, at decision block 607, the routine 600 determines that population of the predefined machining operation variables is complete, the routine 600 then continues at block 608 where the routine 600 inserts the completed machining operation into an NC engine of a CAD/CAM software environment. The routine 600 may end after block 608.

From the foregoing, it will be appreciated that specific embodiments of the invention have been described herein for purposes of illustration, but that various modifications may be made without deviating from the spirit and scope of the invention. For example, while many examples are provided relating to "best practices" the invention may also be used to identify other types of data sets, such as "worst practices" (e.g., practices to avoid during manufacturing). In addition, aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A method for programming numerically controlled machines, the method comprising:
presenting a set of feature options, wherein each of the feature options from the set of feature options relates to a feature to be established with respect to a part;
receiving a selection of one of the feature options from the first set of feature options; and
presenting a set of process options, wherein each of the process options from the set of process options relates to a process that can be used to establish the selected feature option with respect to the part, and wherein each of the process options from the set of process options is consistent with at least one predetermined practice for establishing the selected feature options with respect to the part.

2. The method of claim 1, further comprising:
receiving a selection of one of the process options from the set of process options;
presenting a set of tool options, wherein each of the tool options from the set of tool options relates to a tool that can be used with the selected process option to establish the selected feature option with respect to the part, and wherein each of the tool options from the set of tool options is consistent with at least one predetermined practice for establishing the selected feature option with respect to the part;
receiving a selection of one of the tool options from the set of tool options;
based on the selection of the feature option, the selection of the process option, and the selection of the tool option, generating a best practices data set for integration into a programming environment configured for programming of numerically controlled machines;
integrating the best practices data set with information in a computer aided drafting/manufacturing environment that is configured for facilitating the generation of programs to control numerically controlled machines, wherein the integrating includes:
identifying a partially complete machining operation definition from a set of partially complete machining operation definitions, wherein the partially complete machining operation definition is identified based on its compatibility with the best practices data set;
automatically populating variables of the partially complete machining operation definition, wherein the automatic population is based, at least in part, on the obtained information, and wherein the populated variables include part geometry variables, strategy variables, and cutting parameter variables; and
obtaining input from a user for further populating the variables of the partially complete machining operation definition; and
completing the partially complete machining operation based on the integration.

3. The method of claim 1, further comprising:
receiving a selection of one of the process options from the set of process options; and
presenting a set of tool options, wherein each of the tool options from the set of tool options relates to a tool that can be used with the selected process option to establish the selected feature option with respect to the part, and wherein each of the tool options from the set of tool options is consistent with at least one predetermined practice for establishing the selected feature option with respect to the part.

4. The method of claim 1, further comprising:
receiving a selection of one of the process options from the set of process options;
presenting a set of tool options, wherein each of the tool options from the set of tool options relates to a tool that can be used with the selected process options to establish the selected feature option with respect to the part, and wherein each of the tool options from the set of tool options is consistent with at least one predetermined practice for establishing the selected feature option with respect to the part;
receiving a selection of one of the tool options from the set of tool options; and
presenting a set of computer aided manufacturing (CAM) function options, wherein each of the CAM function options from the set of CAM function options relates to a CAM function that can be used with the selected process option and the selected tool option to establish the selected feature option with respect to the part.

5. The method of claim 1, further comprising:
receiving a selection of one of the process options from the set of process options;
presenting a set of tool options, wherein each of the tool options from the set of tool options relates to a tool that can be used with the selected process option to establish the selected feature option with respect to the part, and wherein each of the tool options from the set of tool options is consistent with at least one predetermined practice for establishing the selected feature option with respect to the part;
receiving a selection of one of the tool options from the set of tool options;
presenting a set of computer aided manufacturing (CAM) function options, wherein each of the CAM function options from the set of CAM function options relates to a CAM function that can be used with the selected process option and the selected tool option to establish the selected feature option with respect to the part;
receiving a selection of one of the CAM function options from the set of CAM function options; and
receiving values associated with parameters related to the CAM function options.

6. The method of claim 1, further comprising:
receiving a selection of one of the process options from the set of process options;
presenting a set of tool options, wherein each of the tool options from the set of tool options relates to a tool that can be used with the selected process option to establish the selected feature option with respect to the part, and wherein each of the tool options from the set of tool options is consistent with at least one predetermined practice for establishing the selected feature option with respect to the part;
receiving a selection of one of the tool options from the set of tool options; and
based on the selection of the feature option, the selection of the process option, and the selection of the tool option, generating a predetermined practices data set for integration into a programming environment configured for programming of numerically controlled machines.

7. A method for programming numerically controlled machines, the method comprising:
obtaining a set of information associated with manufacturing a part, wherein the set of information includes options selected via a user interface that interactively guides a user through one or more available decision paths based on a set of predetermined practices for programming of the numerically controlled machines; and integrating the obtained set of information with information in a programming environment configured for facilitating the programming of numerically controlled machines, wherein integrating includes:
  identifying an incomplete machine operation definition from a set of incomplete machine operation definitions, wherein the incomplete machine operation definition is identified based on its compatibility with the obtained set of information;
  automatically populating variables of the incomplete machine operation definition, wherein the automatic population is based, at least in part, on the obtained information; and
  obtaining input from a user for further populating the variables of the incomplete machine operation definition.

8. The method of claim 7 wherein the integration further comprises referencing part geometry information stored at the programming environment while obtaining input from the user for further populating the variables of the incomplete machine operation definition.

9. The method of claim 7 wherein the set of information associated with manufacturing the part includes a selected feature, a selected process for carrying out the selected feature, and a selected tool for implementing the selected process.

10. The method of claim 7 wherein the user interface is external to the programming environment.

11. The method of claim 7 wherein the incomplete machining operation is used to generate a completed machining operation that can be used for controlling a numerically controlled machine.

12. The method of claim 7 wherein the variables of the incomplete machining operation include geometry variables.

13. The method of claim 7 wherein the variables of the incomplete machining operation include strategy variables.

14. The method of claim 7 wherein the variables of the incomplete machining operation include cutter parameter variables.

15. The method of claim 7 wherein the obtained set of information was generated, at least in part, by a method comprising:
  presenting a set of feature options, wherein each of the feature options from the set of feature options relates to a feature to be established with respect to a part;
  receiving a selection of one of the feature options from the first set of feature options;
  presenting a set of process options, wherein each of the process options from the set of process options relates to a process that can be used to establish the selected feature option with respect to the part, and wherein each of the process options from the set of process options is consistent with at least one predetermined practice for establishing the selected feature options with respect to the part;
  receiving a selection of one of the process options from the set of process options;
  presenting a set of tool options, wherein each of the tool options from the set of tool options relates to a tool that can be used with the selected process option to establish the selected feature option with respect to the part, and wherein each of the tool options from the set of tool options is consistent with at least one predetermined practice for establishing the selected feature option with respect to the part; and
  receiving a selection of one of the tool options from the set of tool options.

16. A system for programming of numerically controlled machines, the system comprising:
  a data set generator configured for generating an information set used in generating programmed instructions for operating a numerically controlled machine, the data set generator comprising:
    a predetermined practices rules component for determining feature options, process options, and tool options for display; and
    a first user interface component for receiving selections of displayed options;
  a programming environment configured for generating programmed instructions for operating the numerically controlled machine, the programming environment comprising:
    a machine operation catalog for storing partially complete machining operations;
    a second user interface component; and
    a parts data component; and
  an integrator component configured for interacting with the programming environment, wherein the interacting includes:
    providing the information set to the programming environment so that a partially complete machining operation can be selected from the machine operation catalog; and
    facilitating the population of variables of the selected partially complete machining operation based on the information set.

17. The system of claim 16, wherein the information set used in generating programmed instructions for operating a numerically controlled machine is retained in one or more data structures associated with a computer-readable medium.

18. The system of claim 16 wherein the interacting with the programming environment further includes providing cutter information to the programming environment.

19. The system of claim 16 wherein the programming environment further includes a numerical control programming engine configured for handling a completed machining operation, and wherein the numerical control programming engine is coupled to a processor for processing completed machining operations in preparation for execution by a machine controller.

20. The system of claim 16 wherein the second user interface component is configured for receiving user input relating to populating variables of the selected partially complete machining operation.

21. The system of claim 16 wherein the second user interface component is configured for receiving user input relating to populating variables of the selected partially complete machining operation, and wherein the second user interface interacts with the parts data component to provide information to facilitate receiving user input.

22. A system for programming of numerically controlled machines, the system comprising:
  means for obtaining a set of information associated with manufacturing a part, wherein the set of information includes options selected via a user interface that interactively guides a user through one or more available decision paths based on a set of predetermined practices for programming of the numerically controlled machines; and
  means for integrating the obtained set of information with information in a programming environment configured for facilitating the programming of the numerically controlled machines, wherein integrating includes:

identifying an incomplete machine operation definition from a set of incomplete machine operation definitions, wherein the incomplete machine operation definition is identified based on its compatibility with the obtained set of information;

automatically populating variables of the incomplete machine operation definition, wherein the automatic population is based, at least in part, on the obtained information; and obtaining input from a user for further populating the variables of the incomplete machine operation definition.

23. The system of claim 22, further comprising means for generating a completed machine operation definition, wherein the completed machine operation definitions is based on the population of variables of the incomplete machine operation definitions.

24. The system of claim 22 wherein the selected options include a feature option relating to a part feature to be machined into the part, a process option relating to a process that can be used to machine the part feature into the part, and a tool feature that can be used to implement the process.

25. The system of claim 22 wherein instructions used in integrating the obtained set of information with information in a programming environment configured for facilitating the programming of the numerically controlled machines are retained in a computer-readable medium.

* * * * *